United States Patent

[11] 3,586,761

[72] Inventor Katsuhito Uetake
Kyoto, Japan

[21] Appl. No. 775,609
[22] Filed Nov. 14, 1968
[45] Patented June 22, 1971
[73] Assignee Mitsubishi Denki Kabushiki Kaisha
Tokyo, Japan
[32] Priority Nov. 15, 1967
[33] Japan
[31] 42/73540

[54] INDICATOR FOR CORRECT TUNING OF COLOR TELEVISION RECEIVER
6 Claims, 2 Drawing Figs.

[52] U.S. Cl. .......... 178/5.4, 178/6
[51] Int. Cl. .......... H04n 9/12
[50] Field of Search .......... 178/5.4, 5.8

[56] References Cited
UNITED STATES PATENTS

| | | | |
|---|---|---|---|
| 3,129,283 | 4/1964 | Tarantur .......... | 178/5.4 |
| 3,324,236 | 6/1967 | Dietch et al. .......... | 178/5.4 |

*Primary Examiner*—Richard Murray
*Attorneys*—Robert E. Burns and Emmanuel J. Lobato

ABSTRACT: A video intermediate frequency amplifier is connected to a frequency selective amplifier to amplify the video intermediate frequency signal. The amplified signal is rectified by a diode to form a DC signal after which it is applied through a control dual triode to selected two of three guns of a tricolor cathode-ray tube at the grid electrodes. The DC signal has a magnitude sufficient to put the control triode in its nonconducting state for detuning or correct tuning of the receiver. Thus the cathode-ray tubing produces images having only a single color associated with the remaining gun for detuning or correct tuning.

INDICATOR FOR CORRECT TUNING OF COLOR TELEVISION RECEIVER

BACKGROUND OF THE INVENTION

This invention relates in general to color television receivers and more particularly to devices for indicating the resonance in such receivers for correct tuning.

Heretofore, in order to indicate that color television receivers have been correctly tuned, there have been mostly used visual indicators such as electron-ray tubes, tuning point indicating meters, etc. As the color television receivers are devices for originally providing visual informations it is unreasonable and expensive to indicate the correct tuning thereof through the use of such visual indicators additionally provided in the receivers. Moreover the televiewers will feel psychologically uneasy about whether or not the images being developed on the associated cathode-ray screen will have correctly correlated with the particular indication on the indicator leading to the inconvenience that he must repeatedly move his eyes from the image to the indicator and vice versa to compare then with each other with the eyes. In addition, he can not see well the indicator because of its small size.

SUMMARY OF THE INVENTION

Accordingly it is an object of the invention to provide a new and improved device for indicating the resonance in a color television receiver for correct tuning.

It is another object of the invention to provide a new and improved device for plainly indicating correct tuning of a color television receiver with a large area of indication.

It is still another object of the invention to provide a new and improved correct tuning indication device incorporated into a color television receiver and utilizing the associated cathode-ray screen adapted to have produced on the entire area images having only a selected one of the three primary colors upon the receiver having been tuned out or correctly.

With the above cited objects in view of the invention resides in a tricolor television receiver comprising tuning means and a tricolor cathode-ray tube including three guns and a phosphor screen wherein an indication device for indicating the resonance in the receiver for correct tuning is provided including means for causing a variation in color of images produce on the phosphor screen in accordance with a change of the receiver from its detuned to its tuned state and vice versa.

In a preferred embodiment of the invention the indication device comprises a frequency selective amplifier connected to a video intermediate frequency amplifier to amplify the video intermediate frequency signal, a diode connected to the selective amplifier to rectify the output from the latter and a control amplifier having supplied thereto the rectified signal, having a magnitude sufficient to put the control amplifier in its nonconducting state for correct tuning or detuning of the receiver, the control amplifier supplying its output to selected two of the guns at the grid electrodes thereby to drive the selected two guns into their cutoff state for detuning or correct tuning whereby the images produced on the phosphor screen have a single color associated with the remaining gun.

BRIEF DESCRIPTION OF THE DRAWING

The invention will become more readily apparent from the following detailed description taken in conjunction with the accompanying drawing in which:

Referring now to FIG. 1, there is illustrated a preferred form of the invention and only that portion operatively associated to the invention of a three gun tricolor television receiver of the conventional construction. The last amplifier state $V_1$ of a video intermediate frequency amplifier is electrically coupled to a color matrix comprising three vacuum tubes $V_R$, $V_G$ and $V_B$ in the manner as well known although it is not illustrated. Those vacuum tubes $V_R$, $V_G$ and $V_B$ are applied to produce at their anode electrodes color difference signals R–Y, G–Y and B–Y respectively where R, G and B represent the actual red, green and blue components and Y represent the luminance signal.

Figure 1:
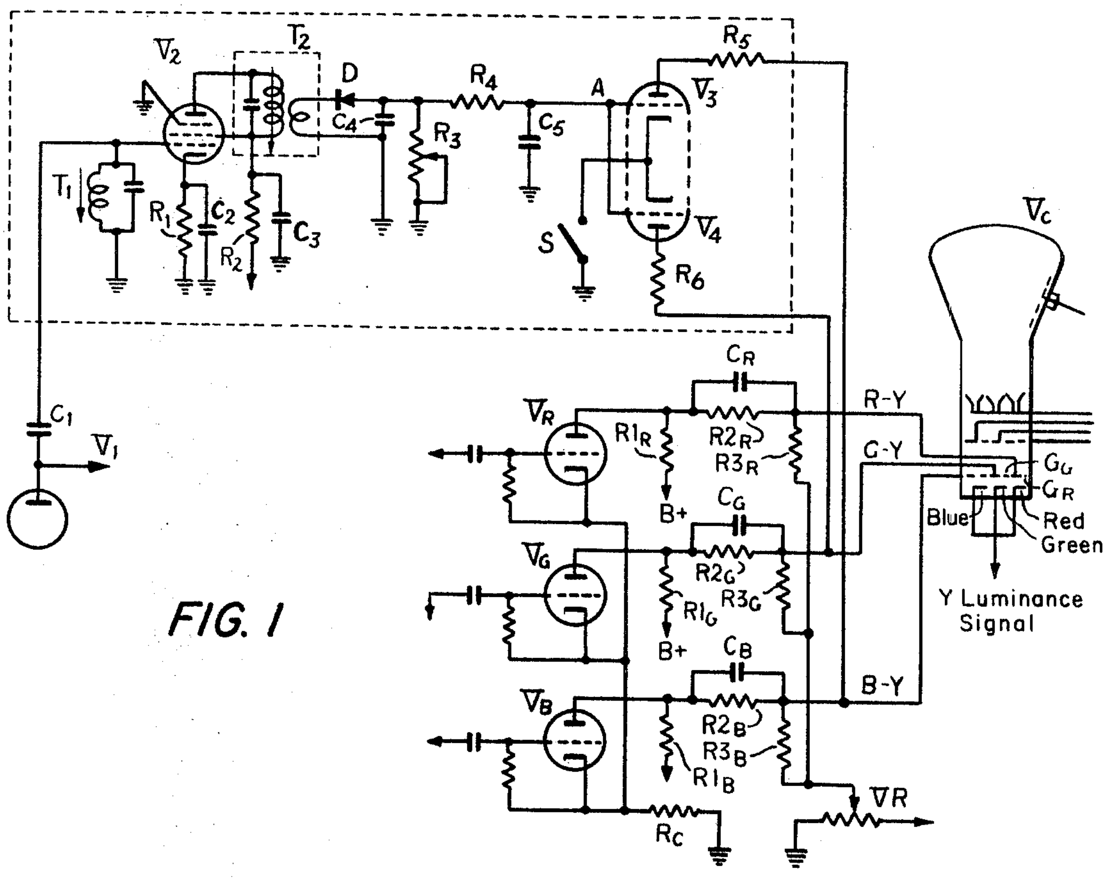
FIG. 1 is a fragmental schematic circuit diagram of a color television receiver constructed in accordance with the principles of the invention.

The red tube $V_R$ is energized by a source of positive voltage B+ through a voltage dropping resistor $R1_R$ and has the anode electrode connected to a parallel combination of a capacitor $C_R$ and a resistor $R2_R$ is, in turn, connected to a grid electrode $G_R$ of a red gun of in a shadow mask type three gun tricolor cathode-ray tube $V_C$ of conventional construction. Thus the tube $V_R$ supplies the color difference signal R–Y to the grid electrode $G_R$ of the red gun. The junction of the C–R parallel combination $C_R$–$R2_R$ and the grid electrode $G_R$ of the cathode-ray tube $V_C$ is connected to a control resistor $R3_R$ for controlling a color bias. The control resistor $R3_R$ is then connected to a slide on a potentiometer VR grounded at one end. Similarly, the green vacuum tube $V_G$ includes the anode electrode energized by the source B+ through a resistor $R1_G$ and connected through a parallel combination of a capacitor $C_G$ and $R2_G$ to a grid electrode $G_G$ of a green gun in the cathode-ray tube $V_C$ to supply the color difference signal G–Y to the grid electrode $G_G$ with that end of the C–R combination near to the grid electrode $G_G$ being connected to a control resistor $R3_G$ for controlling a color bias. Also the blue vacuum tube $V_B$ has connected thereto the similar components designated by the same reference numerals designating the corresponding components connected to the red or green tube and having a suffix "B." The blue tube $V_B$ is adapted to supply the color difference signal B–Y to a grid electrode $G_B$ of a blue gun in the cathode-ray tube $V_C$. The control resistors $R3_G$ and $R3_B$ are similarly connected to the slide on the potentiometer VR. Also all the color tubes include the respective cathode electrodes connected together to one end of a common cathode resistor $R_C$ grounded at the other end.

The three guns include the respective cathode electrodes applied with the luminance signal Y which, in turn, cooperates with the three color difference signals to produce a colored image on the phosphor screen of the tubes in the manner as well known in the art.

All the components as above described are of the conventional design and need not to be further described.

In FIG. 1 a dotted block represents a device for indicating the resonance in the above outlined color television receiver for correct tuning in accordance with the principles of the invention. As shown within the block, the anode electrode of the last intermediate frequency amplifier stage $V_1$ is connected through a coupling capacitor $C_1$ to a frequency selective amplifier shown for example as being a pentode $V_2$ including a cathode electrode connected to a point of reference potential such as the ground potential through a resistor $R_1$ connected in parallel to a capacitor $C_2$, a control grid electrode connected to the point of reference potential through a grid tank circuit $T_1$ and an anode electrode having an anode tank circuit $T_2$ connected between the same and a screen grid electrode which is, in turn, connected to a source of voltage through a resistor $R_2$ biassed to the point of reference potential by a capacitor $C_3$. As shown, both the tank circuits $T_1$ and $T_2$ are preferably of the variable frequency type having, for example, a variable inductance and adapted to be turned to resonate at the video intermediate frequency. Thus the amplifier $V_2$ serves to selectively amplify the video intermediate frequency signal.

The output developed across the tank circuit $T_2$ from the frequency selective amplifier $V_2$ is inductively coupled to a semiconductor diode D where it is rectified into a negative unidirectional signal.

The output of the diode D is connected across a capacitor $C_4$ connected in parallel to a variable resistor $R_3$. That junction of the capacitor $C_4$ and resistor $R_3$ remote from the diode D is connected to the point of reference potential while the other junction thereof is connected to a resistor $R_4$ connected to the point of reference potential through a capacitor $C_5$. The resistor $R_3$ and the capacitor $C_4$ form a low pass filter as do the resistor $R_4$ and the capacitor $C_5$ for the purpose of filtering out the high frequency portion of the rectified signal provided by the diode D.

The junction of the resistor $R_4$ and the capacitor $C_5$ is connected to a direct current amplifier shown as being a dual triode $V_3$–$V_4$. Specifically that junction is connected to two grid electrodes of the dual triode $V_3$–$V_4$. The triode includes two anode electrodes connected to the grid electrodes $G_G$ and $G_B$ of the cathode-ray tube $V_C$ through resistors $R_5$ and $R_6$ respectively. Further the triode includes two cathode electrodes connected to the point of reference potential through a normally open switch S for the purpose as will be apparent hereinafter.

It is assumed that the three guns of the cathode-ray tube $V_C$ are properly operating to develop successively the correctly colored images on the phosphor screen. Under the assumed condition, it is supposed that the potentials on the grid electrodes $G_B$ and $G_G$ of the blue and green guns greatly decrease beyond their properly operating points to cut off the electron beams from those guns. Then the successive images developed on the phosphor screen becomes red alone. Thus if means are provided for successively developing the correctly colored image only for correct tuning of a three gun tricolor television receiver then the particular televiewer can readily accomplish correct tuning thereof while he continues to view the color retention of the images.

Figure 2:
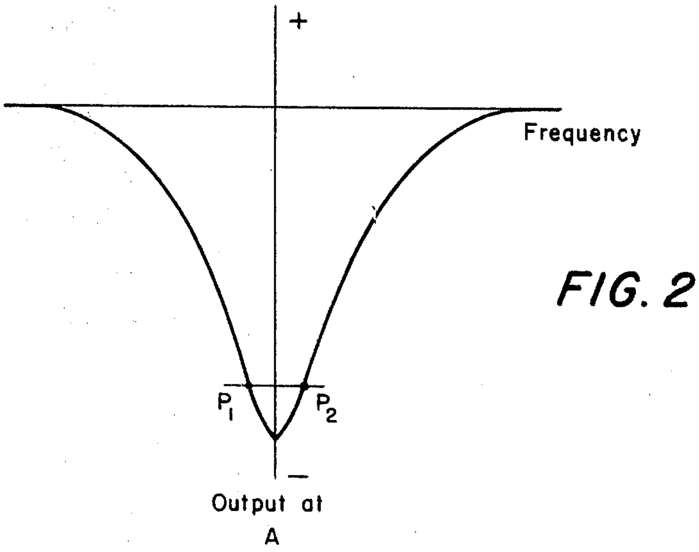
FIG. 2 is a graph useful in explaining the operation of the invention.

More specifically, a potential at a point A connected to both the grid electrodes of the dual diode $V_3$–$V_4$ represents the output from the frequency selective amplifier $V_2$ after having been rectified by the diode D and varies with its frequency as shown at a resonance curve in FIG. 2 wherein the axis of ordinates designates the potential on the point A and the axis of abscissas designates its frequency. In other words, as a tuning knob involved is rotated after the receiver has been correctly tuned to resonate at the video intermediate frequency the potential at the point A will reach its maximum negative magnitude at the video intermediate frequency as shown in FIG. 2.

With the switch S manually closed to put the dual triode $V_3$–$V_4$ in its operating state, the variable resistor $R_3$ can be adjusted to cause the triode to become nonconducting for the potentials at the point A and adjacent the video intermediate frequency. That is, the triode can be put in its nonconducting state for the potentials at the point A negatively greater than those expressed by either of two points $P_1$ or $P_2$ on the resonance curve of FIG. 2 and adjacent to the vally point thereof. Under these circumstances, closing of the switch S does not affect the potentials at the grid electrodes $G_G$ and $G_B$ of the green and blue guns in the cathode-ray tubes $V_C$ because the triode $V_3$–$V_4$ is not conducting to have no current flowing therethrough. This ensures that the cathode-ray tube $V_C$ is maintained to produce the correctly colored images on its phosphor screen.

On the other hand, if the receiver is in its detuned state in which the potential at the point A is negatively less than that at the point $P_1$ or $P_2$ then the dual triode $V_3$–$V_4$ is in its conducting state in which a current flows through each of current paths traced from the source B+ through the resistors $R1_B$, $R2_B$ and $R_5$, the now conducting triode portion $V_3$ or through the resistors $R1_G$, $R2_G$ and $R_6$, the now conducting triode portion $V_4$ and hence to the point of reference potential through the closed switch S. As a result the potential on the green grid electrode $G_G$ abruptly decreases due to voltage drops across the resistors $R1_G$ and $R2_G$ whereupon the green gun is driven into its cutoff state. Similarly voltage drops across the resistors $R1_B$ and $R2_B$ causes the blue gun to be cut off. Thus only the red gun is in its operative state to produce the red images in the entire area of the phosphor screen of the cathode-ray tube $V_C$.

This means that the receiver has not been correctly tuned. Thus by viewing the red images on the screen the particular televiewer can readily find of tuning-out of the receiver and will be required only to operate the associated tuning knob until the correctly colored images are produced on the screen.

Thus it will be appreciated that the changing of the receiver from its correctly tuned to its detuned state and vice versa causes a change in color of the images.

From the foregoing it will be appreciated that the objects of the invention have been accomplished by the provision of a device for indicating the resonance in a tricolor television receiver for correct tuning through the formation of correctly colored images on a phosphor screen of a three gun tricolor cathode-ray tube involve only upon correctly or substantially correctly tuning the receiver.

While the invention has been illustrated are described in conjunction with a single preferred embodiment thereof it is to be understood that numerous changes in the details of construction and the combination and arrangement may be resorted to without departing from the spirit and scope of the invention. For example, the receiver may produce images having the red color alone for correct tuning. In the latter case diode D has its polarity reversed from that illustrated and the dual triode is adapted to be conducting for the potentials at the point A negatively greater than the potential expressed by the point $P_1$ or $P_2$ on the resonance curve shown in FIG. 2. Also instead of the red images, the green or blue images may be produced for correct tuning or detuning. Further, transistors may substitute the vacuum tubes illustrated.

What I claim is:

1. In a tricolor television receiver including tuning means and a three gun tricolor cathode-ray tube having a phosphor screen, an indication device for indicating the resonance in the receiver for correct tuning, comprising narrow band detector means for sensing correct tuning, and automatic color varying means connected to said detector means for causing a variation in color of images produced on the phosphor screen in accordance with the transition of the receiver from its correct tuned to its detuned state and vice versa.

2. An indication device as claimed in claim 1 wherein said color varying means includes means to control the grid electrodes of the cathode-ray tube so as to produce on the entire area of the phosphor screen images having only a selected one of the three primary colors for correct tuning.

3. An indication device as claimed in claim 1 wherein said color varying means includes means to control the grid electrodes of the cathode-ray tube so as to produce on the entire area of the phosphor screen images having only a selected one of the three primary colors for detuning.

4. An indication device as claimed in claim 1, in which said narrow band detector comprises frequency selective amplifier means having the video IF signal of said receiver connected thereto for providing an output whose magnitude is controlled by the tuning means and means for supplying the output from the amplifier means to selected two of three grid electrodes of the cathode-ray tube to permit the images having only a single color associated with the remaining grid electrode to appear on the entire area of the phosphor screen until correct tuning is achieved.

5. In a tricolor television receiver including tuning means and a tricolor cathode-ray tube having a phosphor screen, an improved indicator device for indicating the correct video IF signal in the receiver for correct tuning, comprising, narrow frequency band detector means for detecting the correct video IF signal, and means connected to said detector means for causing a variation in color of images produced on the phosphor screen in accordance with the transition of the receiver from its detuned state to its correctly tuned state.

6. The invention as set forth in claim 5, in which said narrow frequency band detector means comprises amplifier and rectifier means having said video IF signal coupled thereto, and said means for causing a color variation comprises dual bias control means connected between said rectifier means and two color grid electrodes of said cathode-ray tube, wherein said dual bias control means biases said two color grids to cut off until said receiver is correctly tuned, whereupon said dual bias control means is biased by said rectifier means to an inactive state.